United States Patent
Shibasaki

(10) Patent No.: US 8,405,014 B2
(45) Date of Patent: Mar. 26, 2013

(54) LIGHT SOURCE UNIT AND PROJECTOR HAVING A LIGHT SOURCE CONTROL DEVICE FOR CONTROLLING THE EMISSION OF EXCITATION LIGHT AND ROTATING SPEED OF A LUMINESCENT WHEEL

(75) Inventor: Mamoru Shibasaki, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 335 days.

(21) Appl. No.: 12/913,904

(22) Filed: Oct. 28, 2010

(65) Prior Publication Data

US 2011/0096300 A1    Apr. 28, 2011

(30) Foreign Application Priority Data

Oct. 28, 2009    (JP) ................................ 2009-247708

(51) Int. Cl.
    *G01J 1/32*    (2006.01)
(52) U.S. Cl. ......................... 250/205; 353/31
(58) Field of Classification Search .................. 250/205, 250/208.1, 216; 353/31, 84, 85; 345/31, 345/39, 44; 362/19, 84, 231
See application file for complete search history.

(56) References Cited

U.S. PATENT DOCUMENTS

| | | | |
|---|---|---|---|
| 7,234,823 B2 * | 6/2007 | Imade ........................... | 353/102 |
| 2007/0230179 A1 | 10/2007 | Ripoll et al. | |
| 2008/0143970 A1 | 6/2008 | Harbers et al. | |
| 2009/0034284 A1 | 2/2009 | Li et al. | |

FOREIGN PATENT DOCUMENTS

| | | |
|---|---|---|
| JP | 2003-295319 A | 10/2003 |
| JP | 2004-341105 A | 12/2004 |
| JP | 2005-156607 A | 6/2005 |
| JP | 2006-011087 A | 1/2006 |
| JP | 2007-218956 A | 8/2007 |
| KR | 2009-0096718 A | 9/2009 |

OTHER PUBLICATIONS

Korean Office Action dated Mar. 23, 2012 (and English translation thereof) in counterpart Korean Application No. 10-2010-0104907.

* cited by examiner

*Primary Examiner* — Que T Le
(74) *Attorney, Agent, or Firm* — Holtz, Holtz, Goodman & Chick, P.C.

(57) ABSTRACT

To provide a light source unit which prevents a reduction of light emitting efficiency in a luminescent material layer and a projector, a projector includes a light source unit, a display device and a projector control device, the light source unit includes an excitation light shining device, a luminescent wheel on which a luminescent material layer is laid circumferentially which receives the excitation light to emit luminescent light of a predetermined wavelength band, two types of light source devices for emitting light rays of wavelength bands which are different from the predetermined wavelength band, and a light source control device for controlling individually the emission of light by the excitation light shining device and the two types of light source devices and for controlling the rotating speed of the luminescent wheel in accordance with a period of time when the excitation light shining device is turned on.

7 Claims, 8 Drawing Sheets

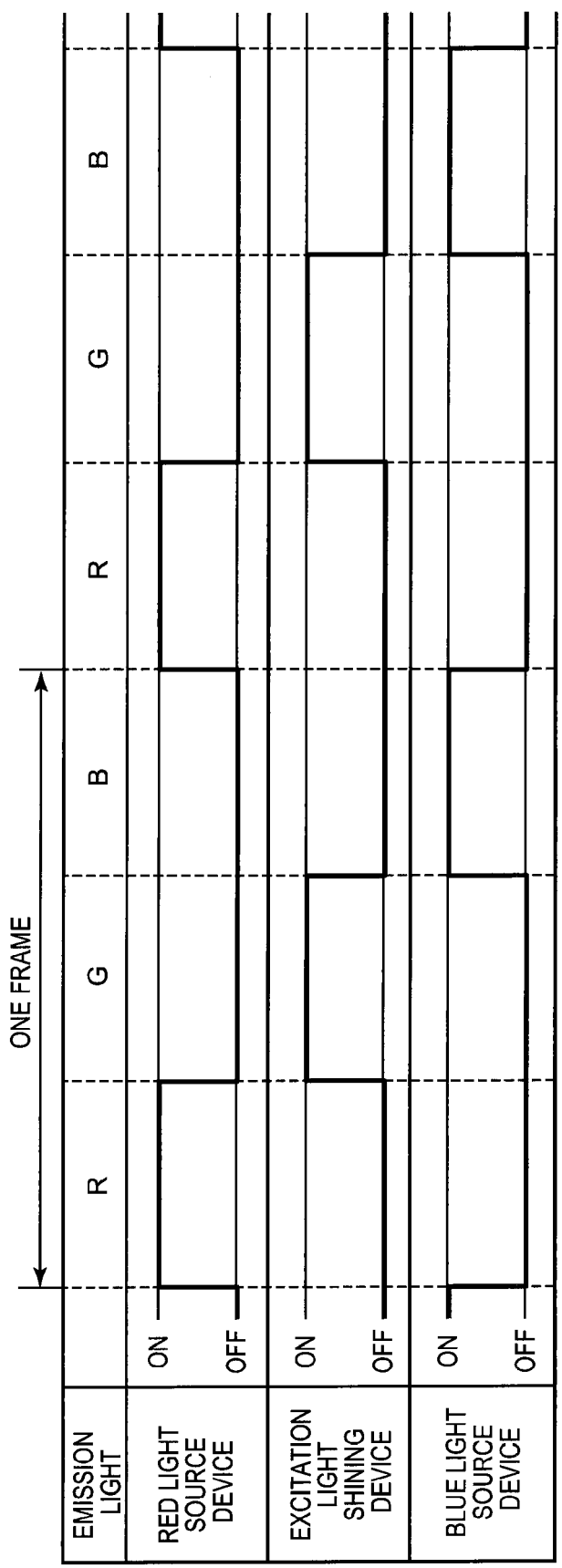

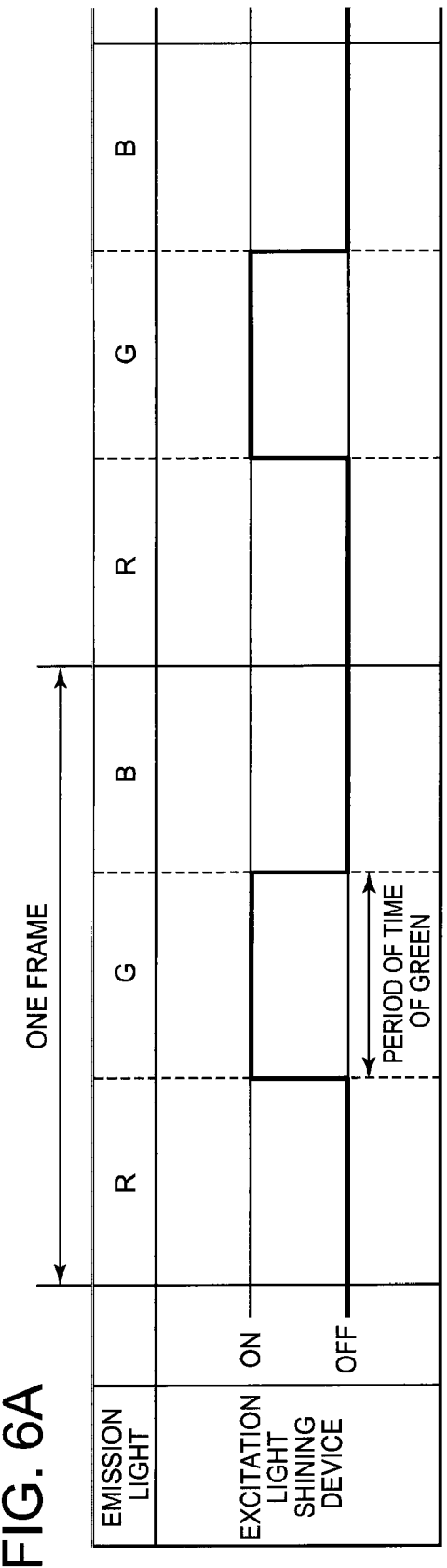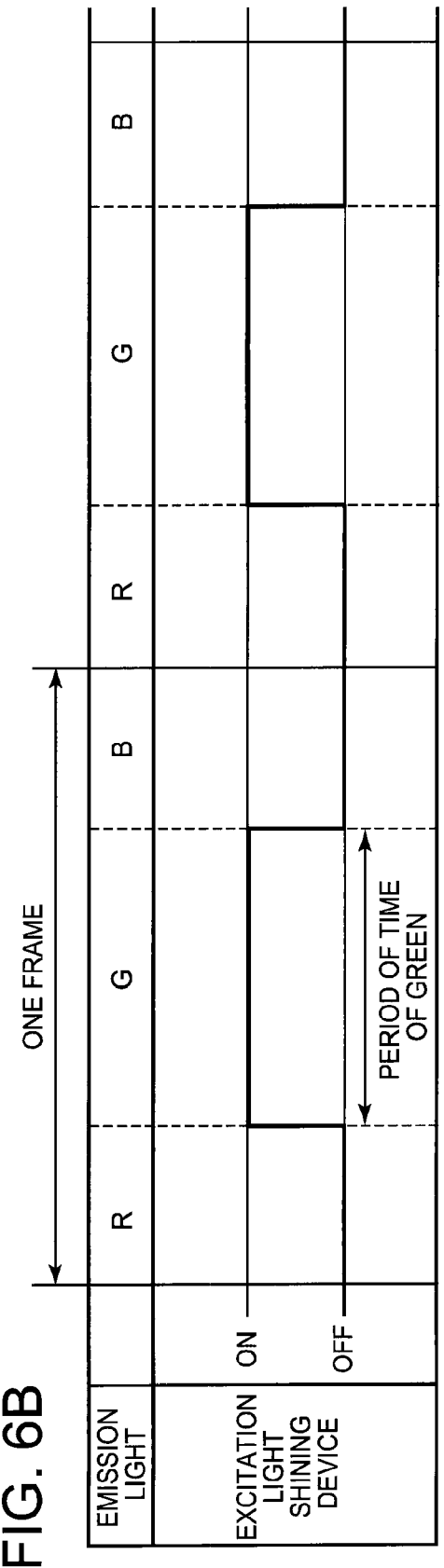

LIGHT SOURCE UNIT AND PROJECTOR HAVING A LIGHT SOURCE CONTROL DEVICE FOR CONTROLLING THE EMISSION OF EXCITATION LIGHT AND ROTATING SPEED OF A LUMINESCENT WHEEL

CROSS-REFERENCE TO RELATED APPLICATIONS

This application is based upon and claims the benefit of priority under 35 USC 119 of Japanese Patent Application No. 2009-247708 filed on Oct. 28, 2009, the entire disclosure of which, including the description, claims, drawings and abstract thereof, is incorporated herein by reference.

BACKGROUND OF THE INVENTION

1. Field of the Invention

The present invention relates to a light source unit and a projector which includes the light source unit.

2. Description of the Related Art

In these days, data projectors are used on many occasions as image projection apparatuses which project images including images of screens and video images of personal computers, as well as images based on image data which is stored in memory cards on to a screen. These projectors are such that light emitted from a light source is collected to a micromirror device called DMD (Digital Micromirror Device) or a liquid crystal plate for display of a color image onto the screen.

In projectors of the type described above, conventionally, projectors using a high-intensity discharge lamp as a light source have been the mainstream of projectors. However, when a white discharge lamp is used as a light source, the color of light from the light source is divided by a color wheel including red, green and blue color filters to cut off other light than light to be used, leading to a problem that the utilization efficiency of light from the light source is low. To cope with this problem, in recent years, there have been made many developments on projectors which use, as a light source, a light emitting diode, a laser diode, a device utilizing organic EL technology or luminescent materials.

For example, Japanese Unexamined Patent Publication No. 2004-341105 (JP-A-2004-341105) proposes a light source unit having a light emitting diode as an excitation light source and a luminescent wheel in which a luminescent material layer or layers which convert ultraviolet light emitted from the excitation light source into visible light are formed on a transparent base material.

Japanese Unexamined Patent Publication No. 2003-295319 (JP-A-2003-295319) proposes a single-color light source unit in which laser beams from laser diodes functioning as excitation light sources are shone on to luminescent materials so that luminescent light rays emitted from the luminescent materials are emitted as parallel light rays by a reflector.

The proposal made in JP-A-2004-341105 is configured so that light rays of red, green and blue wavelength bands can be emitted sequentially. However, since excitation light needs to be shone individually onto the luminescent light emitting areas of the respective colors formed on a surface of the luminescent wheel, there is caused a problem that a large load has to be borne by the excitation light source which is driven at all times. Because of this, the drive output of the excitation light source needs to be suppressed to as to suppress the increase in temperature thereof. In addition, since the colored luminescent light rays are designed to be emitted sequentially from the corresponding luminescent light emitting areas which are formed on the luminescent wheel which rotates at a predetermined rotating speed, periods of time when the colored light rays are emitted from the respective luminescent light emitting areas are restricted by a ratio of the luminescent light emitting areas of the respective colors which are formed on the luminescent wheel. Thus, in the event that a period of time when the light ray of the specific wavelength band is attempted to be lengthened, there is no other way but to adjust it by shortening the periods of time when the light rays of the other wavelength bands are emitted, leading to a problem that the utilization efficiency of light is reduced.

Additionally, the emission of colored light rays from the corresponding luminescent light emitting areas largely depends on the physical properties of the luminescent materials, and therefore, there is also caused a problem that it becomes difficult to display an image with a superior color balance on the screen.

The light source unit can be configured as a light source unit which has a plurality of types of semiconductor light emitting devices so that all the light rays of respective colors can be produced by light emitting diodes. However, as this occurs, there is a situation in which for example, a green semiconductor light emitting device has difficulty in obtaining a higher intensity than those of the other red and blue semiconductor light emitting devices.

The single-color light source unit proposed in JP-A-2003-295319 can be configured so as to project a color image onto the screen by disposing three single-color light source units which function as red, green and blue light source units in the projector. However, since the luminescent materials which receive the citation laser beams to emit the light rays of predetermined wavelength bands are fixed so as not to move, the shining positions of the excitation laser beams are not changed, and hence, the temperatures of the luminescent materials are increased, whereby there is caused a problem that a reduction in wavelength converting efficiency and a deterioration in performance with time are generated by the increase in the temperatures of the luminescent materials.

Here, the respective single-color light source units can be configured with luminescent wheels each. However, as this occurs, excitation light from an excitation light shining device which is controlled with time sharing is shone onto various portions on luminescent material layers which are laid circumferentially on the luminescent wheel. Namely, the shining positions of excitation light on the luminescent material layers scatter thereon, causing portions onto which the excitation light is shone repeatedly and portions onto which almost no excitation light is shone. This promotes the deterioration of only the portions of the luminescent material layers, whereby a reduction in light emission efficiency of the portions in question is called for, inducing an image displayed on the screen to flicker.

SUMMARY OF THE INVENTION

The invention has been made in view of the problem inherent in the related art and an object thereof is to provide a light source unit having a luminescent wheel which has a long life and effects a stable luminescent light emission by preventing variation in deterioration of luminescent material layers and an excitation light shining device for shining excitation light onto the luminescent wheel, and a projector which prevents the occurrence of flickering on a screen by including the light source unit.

According to an aspect of the invention, there is provided a light source unit comprising an excitation light shining device for emitting excitation light, a luminescent wheel on which a luminescent material layer is laid in a circumferential direction which receives the excitation light from the excitation light shining device to emit a luminescent light ray of a predetermined wavelength band, and a light source control device for controlling not only the emission of excitation light by the excitation light shining device but also a rotating speed of the luminescent wheel, wherein the light source control device controls the rotating speed of the luminescent wheel so that the luminescent wheel rotates an integral number of rotations during a period of time when the excitation light shining device is turned on.

The light source unit of the invention further comprises two types of light source devices which emit light rays of wavelength bands which are different from that of the luminescent light ray which is emitted from the luminescent wheel and a light source optical system for collecting the luminescent light ray which is emitted from the luminescent wheel and the light rays which are emitted, respectively, from the two types of light source devices to a predetermined plane, wherein the light source control device controls individually the emission of light rays by the excitation shining device and the two types of light source devices.

In the event that the period of time when the excitation light shining device is turned on changes, the light source control device controls the rotating speed of the luminescent wheel so that the luminescent wheel rotates an integral number of rotations during the changed period of time when the excitation light shining device is turned on.

In this light source unit, the light source control device controls the rotating speed of the luminescent wheel so that the number of rotations of the luminescent wheel becomes one during a period of time when the excitation light shining device is turned on.

In the light source unit of the invention, the excitation light shining device comprises an excitation light source for emitting excitation light of a blue wavelength band, the two types of light source devices include a red light source device having a semiconductor light emitting device for emitting a light ray of a red wavelength band and a blue light source device having a semiconductor light emitting device for emitting a light ray of a blue wavelength band. The luminescent light emitting area of the luminescent wheel receives the excitation light from the excitation light shining device to emit a light ray of a green wavelength band.

In one frame in which the excitation light shining device, the red light source device and the blue light source device are turned on once and sequentially, in the event that the periods of time when the excitation light shining device, the red light source device and the blue light source device are turned on change, the light source control device executes a control to change the rotating speed of the luminescent wheel in accordance with the changed period of time when the excitation light shining device is turned on.

According to another aspect of the invention, there is provided a projector comprising any of the light source units described above, a display device, a light guiding optical system for guiding light from the light source unit to the display device, a projection-side optical system for projecting an image emitted from the display device onto a screen, and a projector control device for controlling the light source unit and the display device.

According to the invention, there can be provided the light source unit having the luminescent wheel having the luminescent material layer which receives the excitation light to produce the light ray of the predetermined wavelength band and the excitation light shining device for shining the excitation light onto the luminescent material on the luminescent wheel, wherein the light source control device controls the emission of excitation light by the excitation light shining device and controls the rotating speed of the luminescent wheel so that the number of rotations of the luminescent wheel becomes an integral number during the period of time when the excitation light shining device is turned on, whereby the variation in deterioration of the luminescent material layer which is laid in the circumferential direction can be prevented and the performance thereof can be maintained over a long period of time, and the projector which comprises the light source unit so that no flickering is produced on the screen.

In the event that the light source unit adopts the configuration in which it comprises further the two types of light source devices having the semiconductor light emitting devices such as light emitting diodes so that light rays of various colors are able to be emitted from the light source unit based on the luminescent light from the luminescent wheel onto which the excitation light is shone by the excitation light shining device and the light source light rays which are emitted from the two types of light source devices, respectively, there can be provided the light source unit which can realize enhancement in luminance without providing a light emitting diode which emits a light ray of a predetermined wavelength band of green, for example, with which it is relatively difficult to obtain high luminance in a semiconductor light emitting device, and the projector comprising the light source unit.

Since it is possible to effect a duty drive in which the excitation light source of the excitation light shining device and the semiconductor light emitting devices of the two types of light sources are switched on and off, there can be provided the light source unit which can produce visible light rays such as bright luminescent light rays by increasing the output when the excitation light source and the semiconductor light emitting devices are turned on to emit corresponding light rays, and the projector comprising the light source unit.

BRIEF DESCRIPTION OF THE DRAWINGS

The invention will be understood much sufficiently by reading the following detailed description thereof and referring to the accompanying drawings. However, the detailed description and the accompanying drawings are intended mainly to describe the invention and are not intended to limit the scope thereof. In the accompanying drawings;

FIG. 5 is a time chart showing periods of time when an excitation light shining device and two types of light sources according to the embodiment of the invention are turned on, FIGS. 6A and 6B are time charts showing periods of time when the excitation light shining device according to the embodiment of the invention is turned on, FIGS. 7A and 7B are exemplary drawings showing excitation light shining areas on the rotating luminescent wheel according to the embodiment of the invention.

DETAILED DESCRIPTION OF THE PREFERRED EMBODIMENT

Figure 1:
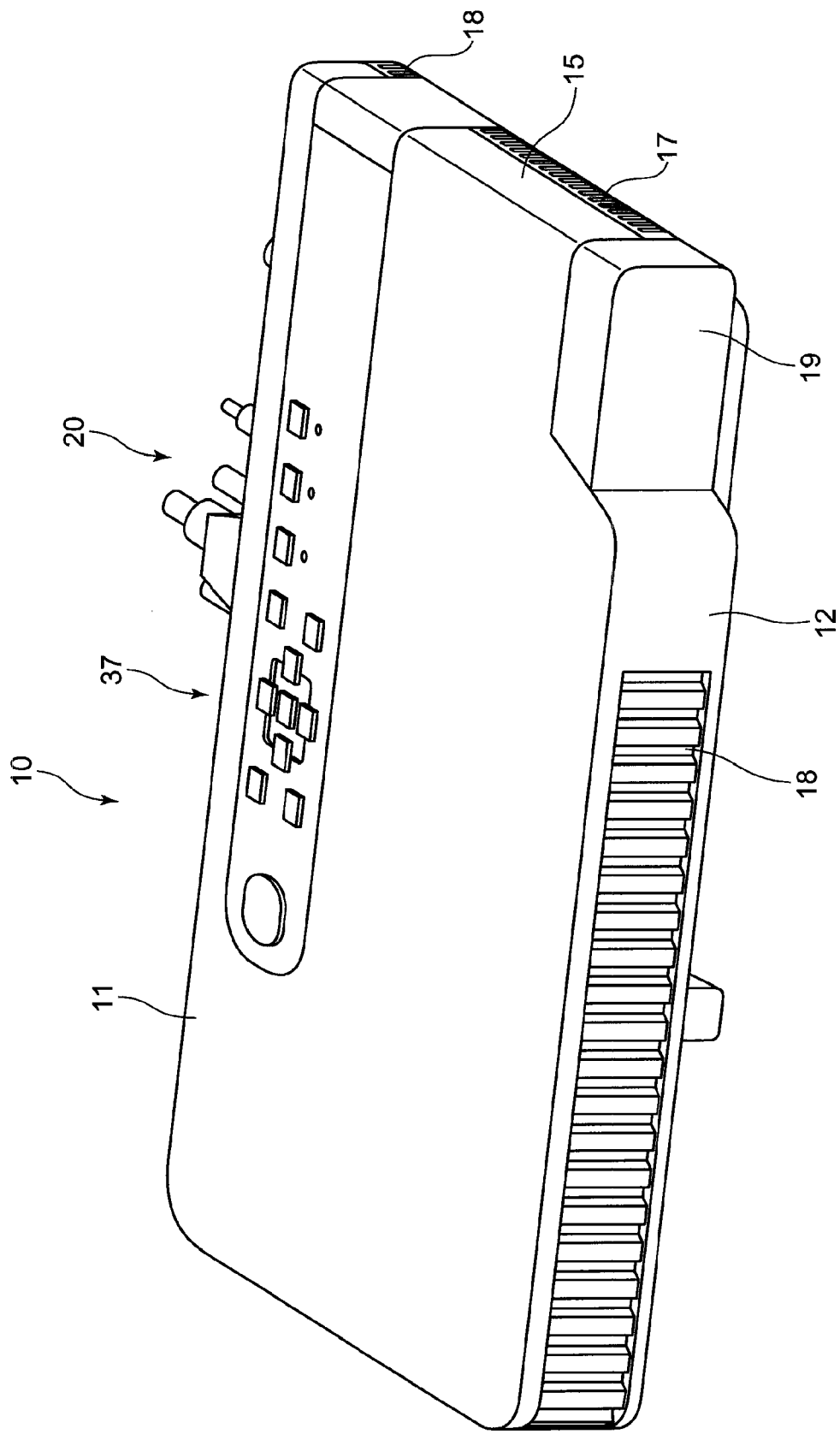
FIG. 1 is a perspective view showing an external appearance of a projector including a light source unit according to an embodiment of the invention.

Hereinafter, a preferred mode for carrying out the invention will be described by use of the accompanying drawings. Although various limitations which are technically preferable for carrying out the invention are imposed on an embodiment which will be described below, the scope of the invention is not limited in any way to the following description and illustrated examples.

Hereinafter, a mode for carrying out the embodiment will be described. A projector 10 includes a light source unit 60, a display device 51, a light guiding optical system 170 for guiding light from the light source unit 60 to the display device 51, a projection-side optical system 220 for projecting an image emitted from the display device 51 onto a screen, and a projector control device for controlling the light source unit 60 and the display device 51.

The light source unit 60 further includes an excitation light shining device 70, a luminescent light emitting device 100 having a luminescent wheel 101 which is controlled to be driven to rotate, a red light source device 120, a blue light source device 300, and a light source optical system 140. The excitation light shining device 70 includes an excitation light source 71 for shining excitation light rays of a blue wavelength band onto the luminescent wheel 101. The luminescent wheel 101 of the luminescent light emitting device 100 has an annular luminescent light emitting area where a green luminescent material layer 103 is formed on a circular disc-like metallic base material. In addition, a reflecting surface which reflects light is formed on the luminescent light emitting area, and the green luminescent material layer 103 which receives the excitation light to emit luminescent light of a green wavelength band is formed on the reflecting surface.

Consequently, when the light of the blue wavelength band is shone onto the luminescent light emitting area from the excitation light shining device 70, the light of the green wavelength band is emitted from the green luminescent material layer 103 which has absorbed the blue light as the excitation light. Namely, the luminescent wheel 101 is made up of the metallic base material which is driven to rotate by a wheel motor 110 and functions as a luminescent plate which emits the luminescent light of the green wavelength band by receiving the excitation light on the luminescent light emitting area which is laid on the disc-shaped base material in the circumferential direction.

The red light source device 120 has a red light source 121 which is a semiconductor light emitting device for emitting light of a red wavelength band. The blue light source device 300 has a blue light source 301 which is a semiconductor light emitting device for emitting light of a blue wavelength band. The light source optical system 140 is configured so as to alter optical axes of light rays of various colors which are emitted from the luminescent wheel 101, the red light source device 120 and the blue light source device 300 so as to collect the colored light rays to an incident port of a light tunnel 175 which constitutes a predetermined plane. The light source optical system 140 has pluralities of dichroic mirrors and collective lenses.

A light source control device in the projector control device controls individually the emission of light by the excitation light shining device 70, the red light source device 120 and the blue light source device 300. The light source control device also controls the excitation light source 71 of the excitation light shining device 70 and the wheel motor 110 of the luminescent wheel 101 so that a period of time required for the luminescent wheel 101 to rotate one rotation and a period of time when the excitation light shining device 70 is turned on are synchronized with each other. Specifically, the light source control device controls a rotating speed of the luminescent wheel 101 so that the number of rotations of the luminescent wheel 101 during the period of time when the excitation light shining device 70 is turned on becomes one.

In one frame in which the excitation light shining device 70, the red light source device 120 and the blue light source device 300 are turned on once and sequentially by the light source control device, in the event that the periods of time when the excitation light shining device 70, the red light source device 120 and the blue light source device 300 are turned on change, the light source control device executes a control to change the rotating speed of the luminescent wheel 101 in accordance with the change period of time when the excitation light shining device 70 is turned on.

Hereinafter, an embodiment of the invention will be described in detail by reference to the accompanying drawings.

FIG. 1 is a perspective view showing an external appearance of a projector 10. In this embodiment, left and right with respect to the projector 10 denote, respectively, left and right directions with respect to a projecting direction, and front and rear denote, respectively, front and rear directions with respect to a screen side direction of the projector 10 and a traveling direction of a pencil of light or light rays.

As is shown in FIG. 1, the projector 10 has a substantially rectangular-parallelepiped shape and has a lens cover 19 which covers a projection port which is laid to a side of a front panel 12 which is referred to as a front side panel of a housing of the projector, as well as a plurality of outside air inlet holes 18 in the front panel 12. Further, although not shown, the projector 10 includes an Ir reception part for receiving a control signal from a remote controller.

In addition, a keys/indicators part 37 is provided on an upper side panel 11 of the housing. Disposed on this keys/indicators part 37 are keys and indicators which include a power supply switch key, a power indicator which informs whether the power supply is on or off, a projection switch key which switches on or off projection, an overheat indicator which informs of an overheat condition when the light source unit, the display device or the control circuit overheats and the like.

Further, provided on a back side or a back side panel of the housing are an input/output connectors part where USB terminals, an image signal input D-SUB terminal, an S terminal, an RCA terminal and the like and various types of terminals 20 including a power supply adaptor plug and the like. A plurality of outside air inlet holes 18 are formed in the back side panel. A plurality of inside air outlet ports 17 are formed in each of a right-hand side panel 14 which constitutes a side panel of the housing, not shown, and a left-hand side panel 15 which constitutes a side panel shown in FIG. 1. In addition, outside air inlet holes 18 are also formed in a corner portion of the left-hand side panel 15 which lies in proximity to the back side panel. Further, a plurality of outside air inlet holes or a plurality of inside air outlet holes are formed in a bottom panel, which is not shown, in each of positions lying in proximity to the front side panel, the back side panel, the left-hand side panel and the right-hand side panel.

Figure 2:
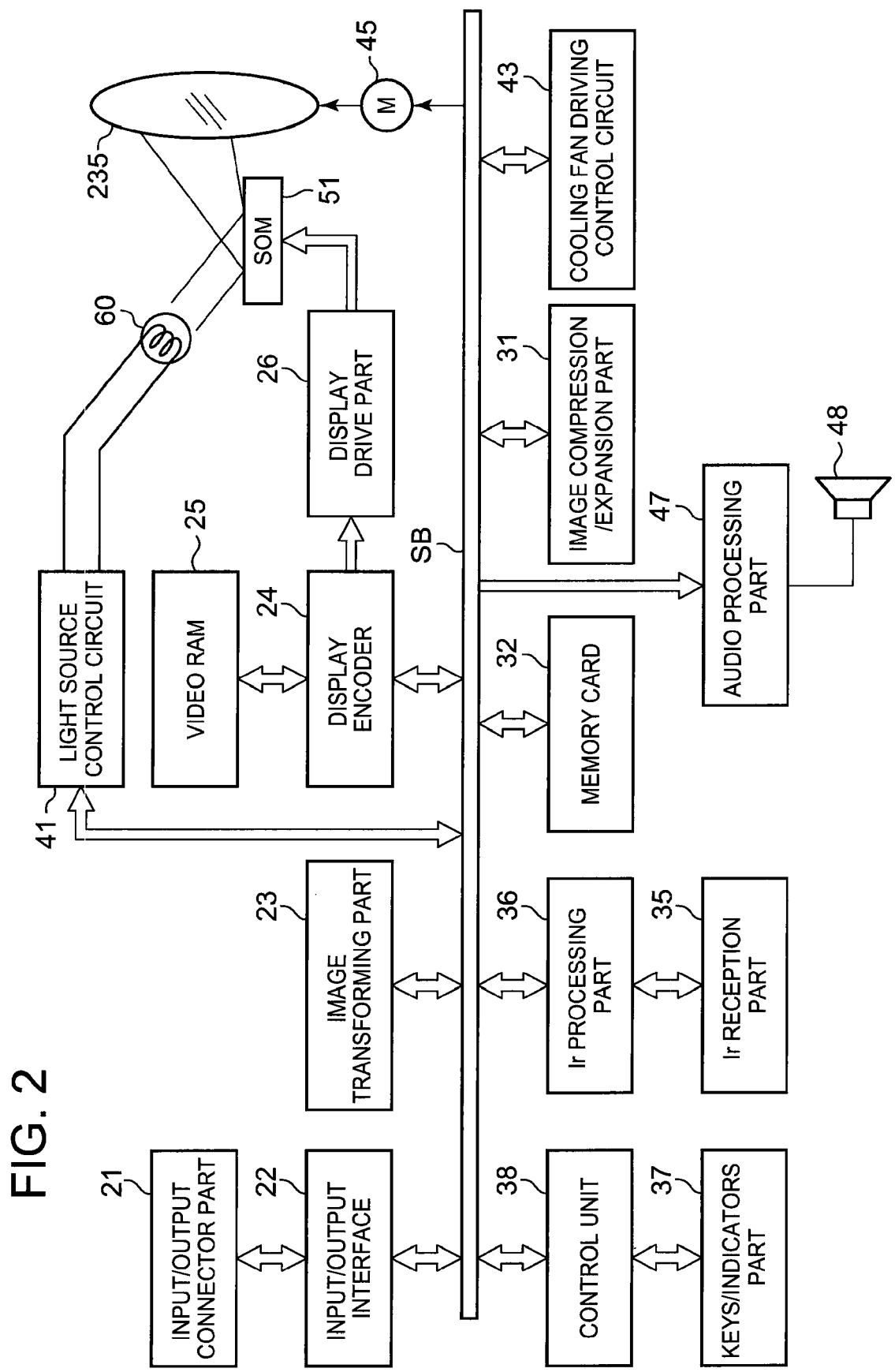
FIG. 2 is a functional circuit block diagram of the projector including the light source unit according to the embodiment of the invention.

Next, a projector control device of the projector 10 will be described by use of a block diagram in FIG. 2. The projector control device includes a control unit 38, an input/output interface 22, an image transforming part 23, a display encoder 24, a display drive part 26 and the like.

The control unit 38 governs the control of respective operations of circuitries within the projector 10 and is made up of a CPU, a ROM which stores in a fixed fashion operation programs of various types of settings and a RAM which is used as a work memory.

Image signals of various standards that are inputted from the input/output connector part 21 are sent via the input/output interface 22 and a system bus (SB) to the image transforming part 23 where the image signals are transformed so as to be unified into an image signal of a predetermined format which is suitable for display. Thereafter, the image signals so transformed are outputted to the display encoder 24.

In addition, the display encoder 24 deploys the image signals entered thereinto on a video RAM 25 for storage therein and generates a video signal from the contents stored in the video RAM 25, outputting the video signal so generated to the display drive part 26.

The display drive part 26 functions as a display device controller and drives a display device 51 which is a spatial optical modulator (SOM) at an appropriate frame rate in accordance with the image signal outputted from the display encoder 24. A pencil of light or light rays which are emitted from a light source unit 60 are shone onto the display device 51 via a light guiding optical system to thereby form an optical image by reflected light reflected at the display device 51. The image so formed can be projected onto a screen, not shown, for display via a projection-side optical system, which will be described later. A movable lens group 235 of the projection-side optical system is driven by a lens motor 45 for zooming or focusing.

In addition, an image compression/expansion part 31 performs a recording operation in which a luminance signal and a color difference signal of an image signal are data compressed through ADCT and Huffman effect and the compressed data is sequentially written on a memory card 32 which is configured as a detachable recording medium. The image compression/expansion part 31 further performs an operation in which when in a reproducing mode, the image compression/expansion part 31 reads out image data recorded on the memory card 32 and expands individual image data which make up a series of dynamic images frame by frame. Then, the image data is outputted to the display encoder 24 via the image transforming part 23 so as to enable the display of dynamic images on the basis of the image data stored on the memory card 32.

Operation signals generated at the keys/indicators part 37 which is made up of the main keys and indicators provided on the upper side panel 11 of the housing are sent out directly to the control unit 38, while key operation signals generated by operating keys on the remote controller are received by the Ir reception part 35, and a code signal demodulated at an Ir processing part 36 is outputted to the control unit 38.

In addition, an audio processing part 47 is connected to the control unit 38 via the system bus (SB). This audio processing part 47 includes a sound source circuit such as a PCM sound source. When in a projection mode and a reproducing mode, the audio processing part 47 converts audio data into analog signals and drives a speaker 48 to output loudly sound or voice based on the audio data.

Additionally, the control unit 38 controls a light source control circuit 41 which is configured as a light source control device. This light source control circuit 41 controls individually the emission of light by an excitation light shining device, a red light source device and a blue light source device of the light source unit 60 so that light of a predetermined wavelength band which is required at the time of generating an image is emitted from the light source unit 60. In addition, this light source control circuit 41 can change a rotating speed of a luminescent wheel by controlling a wheel motor of the luminescent wheel.

Further, the control unit 38 causes a cooling fan drive control circuit 43 to detect temperatures through a plurality of sensors which are provided at the light source unit 60 so as to control the rotating speed of a cooling fan based on the results of the temperature detection. In addition, the control unit 38 also causes the cooling fan drive control circuit 43 to make the cooling fan continue to rotate even after the power supply of a projector main body is switched off by use of a timer or the like or to make the power supply to the projector main body be cut off depending upon the results of the temperature detection by the temperature sensors.

Figure 3:
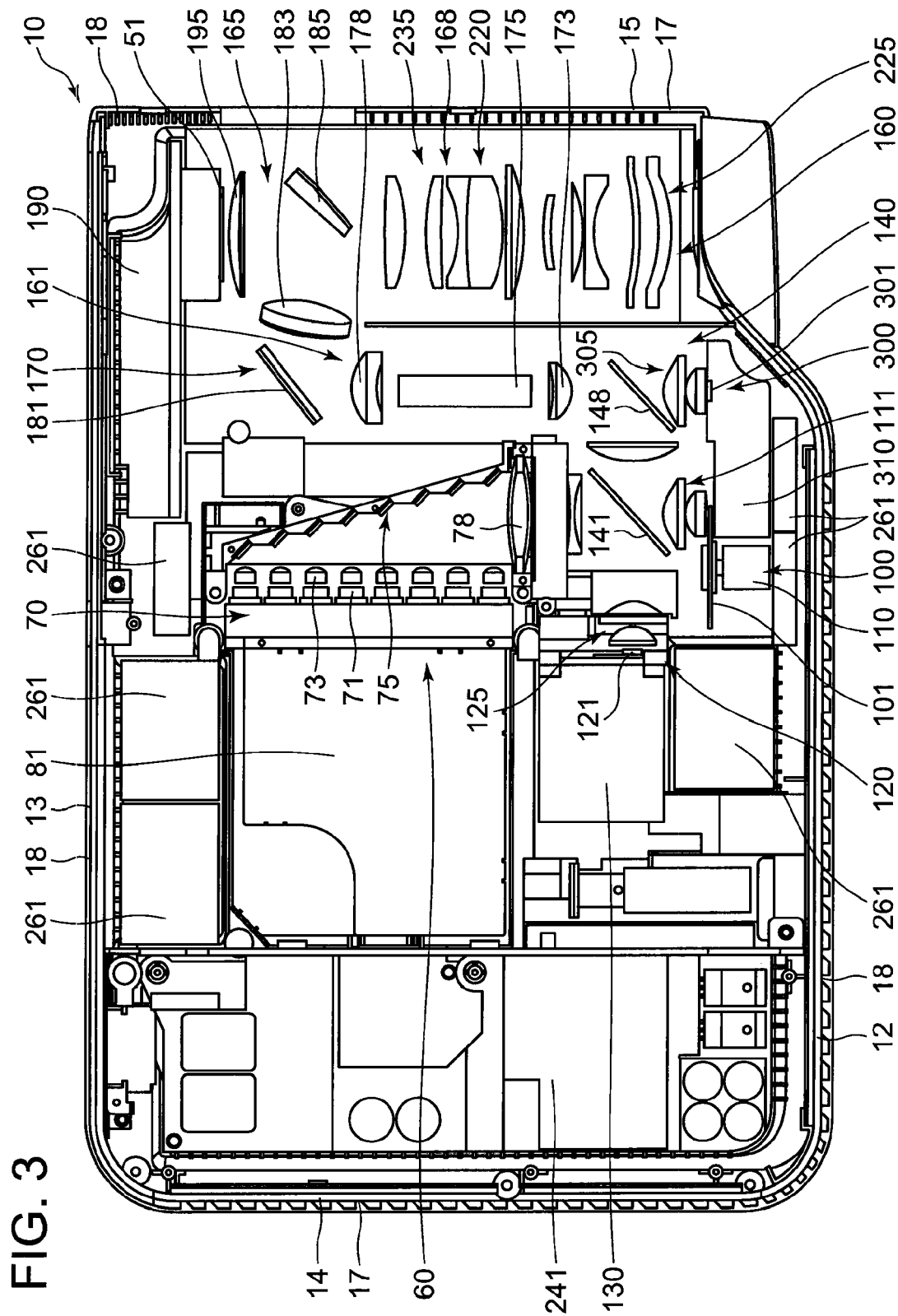
FIG. 3 is an exemplary plan view showing an internal construction of the projector including the light source unit according to the embodiment of the invention.

Next, an internal construction of the projector 10 will be described. FIG. 3 is an exemplary plan view showing an internal construction of the projector 10. As is shown in FIG. 3, the projector 10 includes a control circuit board 241 which is disposed in proximity to the right-hand side panel 14. This control circuit board 241 includes a power supply circuit block and a light source control block. In addition, the projector 10 includes the light source unit 60 which is provided at a substantially central portion of the housing of the projector. Further, the projector 10 includes an optical system unit 160 which is disposed between the light source unit 60 and the left-hand side panel 15.

The light source unit 60 includes an excitation light shining device 70 which is disposed at a substantially central portion of the housing of the projector in a left-right direction and in proximity to the back panel 13, a luminescent light emitting device 100 which is disposed on optical axes of light rays which are emitted from the excitation light shining device 70 and in proximity to the front panel 12, a blue light source device 300 which is disposed in proximity to the front panel 12 so as to be in parallel with the light rays which are emitted from the luminescent light emitting device 100, a red light source device 120 which is disposed between the excitation light shining device 70 and the luminescent light emitting device 100, and a light source optical system 140 which alters optical axes of the light rays emitted from the luminescent light emitting device 100, optical axes of the light rays emitted from the red light source device 120 and optical axes of the light rays emitted from the blue light source device 300 so that the respective optical axes of the light rays converge to the same optical axis as to collect the respective colored light rays on to an incident opening of a light tunnel 175 which constitutes a predetermined plane.

The excitation light shining device 70 includes an excitation light source 71 which is disposed so that optical axes of light rays emitted therefrom become parallel to the back panel 13, a reflecting mirror group 75 which alters the optical axes of the light lays emitted from the excitation light source 71 through 90 degrees so as to be oriented towards the front panel 12, a collective lens 78 for collecting the light rays emitted from the excitation light source 71 and reflected on the reflecting mirror group 75 and a heat sink 81 which is disposed between the excitation light source 71 and the right-hand side panel 14.

The excitation light source 71 includes a plurality of blue laser diodes which are arranged into a matrix configuration, and collimator lenses 73 are disposed individually on optical axes of the blue laser diodes so as to convert light rays emitted from the respective blue laser diodes into parallel light rays. In the reflecting mirror group 75, a plurality of reflecting mirrors are arranged in a step-like fashion so as to emit the light rays emitted from the excitation light source 71 towards the collective lens 78 while reducing sectional areas of the light rays so emitted in one direction.

A cooling fan 261 is disposed between the heat sink 81 and the back panel 13, and the excitation light source 71 is cooled by the cooling fan 261 and the heat sink 81. Further, a cooling fan 261 is also disposed between the reflecting mirror group 75 and the back panel 13, and the reflecting mirror group 75 and the collective lens 78 are cooled by the cooling fan 261.

The luminescent light emitting device 100 includes a luminescent wheel 101 which is disposed so as to be parallel to the front panel 12, that is, so as to be at right angles to the optical axis of the light emitted from the excitation light shining device 70, a wheel motor 110 which drives the luminescent wheel 101 to rotate and a collective lens group 111 which collects light rays emitted from the luminescent wheel 101 in the direction of the back panel 13.

Figure 4A:
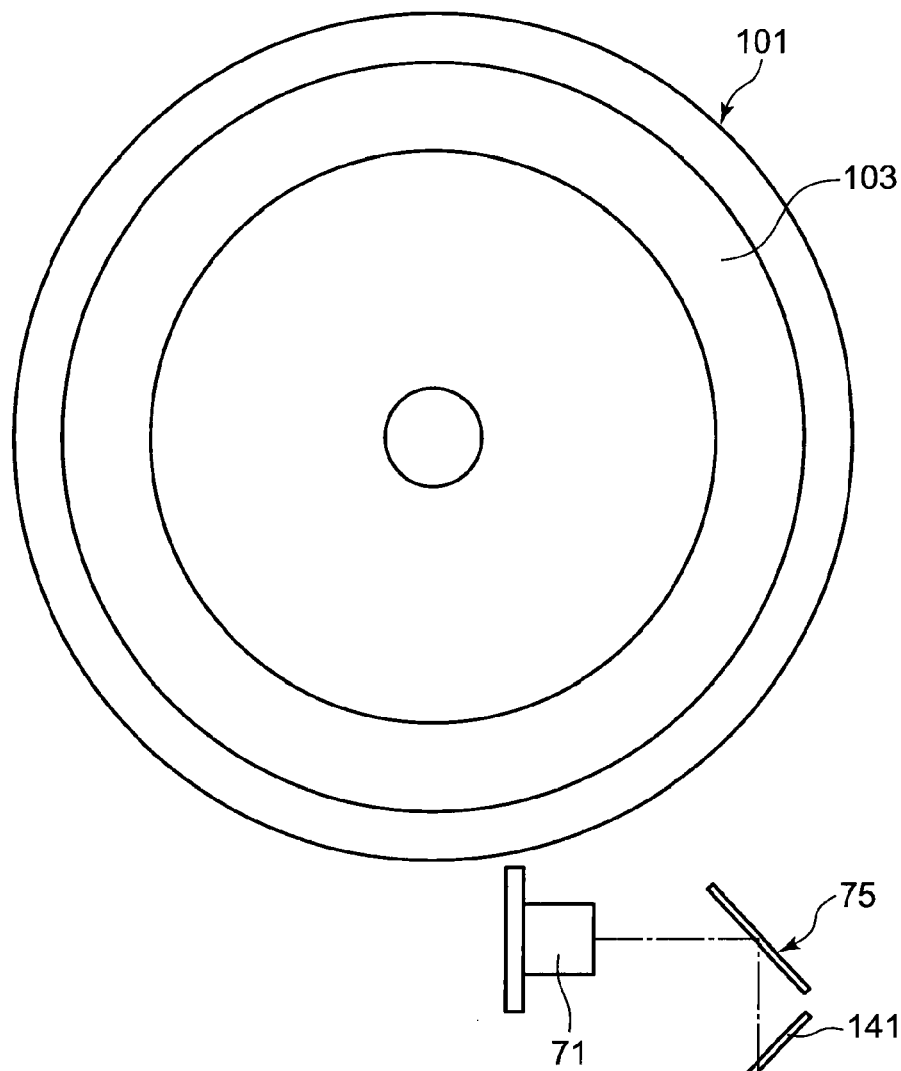
FIG. 4A is an exemplary front view of a luminescent wheel according to the embodiment of the invention.
Figure 4B:
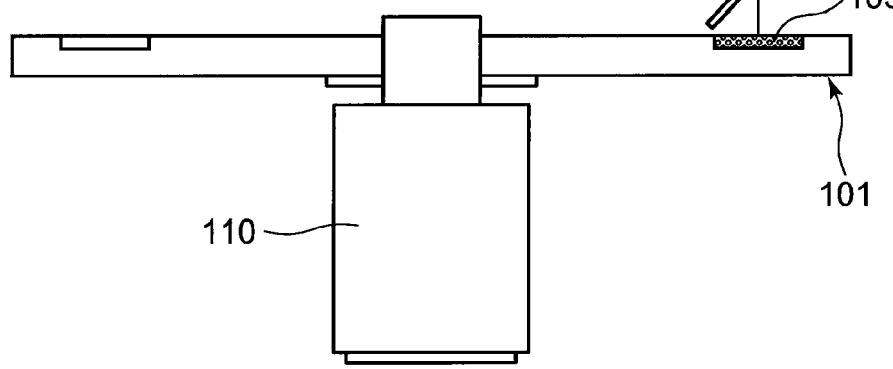
FIG. 4B is an exemplary partially sectional plan view of the luminescent wheel according to the embodiment of the invention.

As is shown in FIG. 4, the luminescent wheel 101 is a circular disc-shaped base material. An annular luminescent light emitting area is formed on the luminescent wheel 101 as a recess portion. This annular luminescent light emitting area receives the light emitted from the excitation light source 71 as excitation light so as to emit luminescent light of a green wavelength band. The luminescent wheel 101 functions as a luminescent plate which receives excitation light so as to emit luminescent light. A surface of an excitation light source 71 side of the luminescent wheel 101 which includes the luminescent light emitting area is mirror-finished through silver deposition and the like so as to form a reflecting surface thereon. A green luminescent material layer 103 is laid on this reflecting surface.

The light emitted from the excitation light shining device 70 so as to be shone onto the green luminescent material layer 103 of the luminescent wheel 101 excites a green luminescent material in the green luminescent material layer 103. Luminescent light rays which are emitted by luminescence in every direction from the green luminescent material are emitted directly towards the excitation light source 71 side or is reflected on the reflecting surface so as to be then emitted towards the excitation light source 71. Excitation light which is shone onto the metallic base material without being absorbed by the luminescent material in the luminescent material layer 103 is reflected on the reflecting surface so as to enter the luminescent material layer 103 again to excite the luminescent material layer 103. Consequently, by making a surface of the recess portion in the luminescent wheel 101 function as the reflecting surface, the utilization efficiency of excitation light emitted from the excitation light source 71 can be increased so that the luminescent wheel 101 can luminesce more brightly.

In excitation light which is reflected towards the luminescent material layer 103 side on the reflecting surface of the luminescent wheel 101, excitation light emitted towards the excitation light source 71 side without being absorbed by the luminescent material passes through a primary dichroic mirror 141, which will be described later, while luminescent light is reflected by the primary dichroic mirror 141. Thus, there is no such situation that excitation light is emitted to the outside of the light source unit 60. Then, as is shown in FIG. 3, the cooling fan 261 is disposed between the wheel motor 110 and the front panel 12, whereby the luminescent wheel 101 is cooled by this cooling fan 261.

The red light source device 120 includes a red light source 121 which is disposed so that its optical axis becomes parallel to the excitation light source 71 and a collective lens group 125 which collects light emitted from the red light source 121. This red light source device 120 is disposed so that its optical axis intersects the light emitted from the excitation shining device 70 and the luminescent light of the green wavelength band emitted from the luminesce wheel 101 at right angles. The red light source 121 is a red light emitting diode which is a semiconductor light emitting device which emits light of a red wavelength band. The red light source device 120 includes a heat sink 130 which is disposed on a side of the red light source 121 which faces the right-hand side panel 14. A cooling fan 261 is disposed between the heat sink 130 and the front panel 12, whereby the red light source 121 is cooled by this cooling fan 261.

The blue light source device 300 includes a blue light source 301 which is disposed so as to be parallel to an optical axis of the luminescent light emitted from the luminescent light emitting device 100 and a collective lens group 305 which collects light emitted from the blue light source 301. This blue light source device 300 is disposed so that its optical axis intersects the light emitted from the red light source device 120. The light source 301 is a blue light emitting diode which is a semiconductor light emitting device which emits light of a blue wavelength band. The blue light source device 300 includes a heat sink 310 which is disposed on a side of the blue light source 301 which faces the front panel 12. A cooling fan 261 is disposed between the heat sink 310 and the front panel 12, whereby the blue light source 301 is cooled by this cooling fan 261.

The light source optical system 140 includes a collective lens which collects light rays of red, green and blue wavelength bands and dichroic mirrors which alter optical axes of the light rays of the respective wavelength bands so that the light rays converge to the same optical axis. Specifically, the primary dichroic mirror 141 is disposed in a position where the optical axes of the light of the blue wavelength band emitted from the excitation light shining device 70 and the light of the green wavelength band emitted from the luminescent wheel 101 intersect the optical axis of the light of the red wavelength band emitted from the red light source device 120. This primary dichroic mirror 140 transmits the light of the blue wavelength band and the light of the red wavelength band and reflects the light of the green wavelength band so as to alter the optical axis of the light of the green wavelength band through 90 degrees in the direction of the left-hand side panel 15.

A secondary dichroic mirror 148 is disposed in a position where the optical axis of the light of the blue wavelength band emitted from the blue light source device 300 and the optical axis of the light of the red wavelength band emitted from the red light source device 120 intersect each other. This secondary dichroic mirror 148 transmits the light of the blue wavelength band and reflects the light of the green wavelength band and the light of the red wavelength band so as to alter the optical axes of the light of the green wavelength band and the light of the red wavelength band through 90 degrees in the direction of the back panel 13. A collective is disposed between the primary dichroic mirror 141 and the secondary dichroic mirror 148.

The optical system unit 160 has a substantially U-shape and includes three blocks such as an illumination-side block 161 which is positioned to a left-hand side of the excitation light shining device 70, an image generation block 165 which is positioned in proximity to a position where the back panel 13 and the left-hand side panel 15 intersect each other, and a projection side block 168 which is positioned between the light source optical system 140 and the left-hand side panel 15.

The illumination-side block 161 includes part of a light guiding optical system 170 which guides light source light emitted from the light source unit 60 to the display device 51 which is included in the image generation block 161. The light guiding optical system 170 that is included in the illumination-side block 161 includes the light tunnel 175 which converts light rays emitted from the light source unit 60 into light rays whose intensity distribution is uniform, a collective lens 173 which collects the light source light onto an incident plane of the light tunnel 175, a collective lens 178 which collets light rays emitted from the light tunnel 175, an optical axis altering mirror 181 which alters optical axes of the light rays emitted from the light tunnel 175 in the direction of the image generation block 165.

The image generating block 165 has, as the light guiding optical system 170, a collective lens 183 which collects the light source light which is reflected by the optical axis altering mirror 181 to the display device 51 and a shining mirror 185 which shines the light rays which have passed through the collective lens 183 onto the display device 51 at a predetermined angle. The image generation block 165 includes further a DMD which is the display device 51. A heat sink 190 is disposed between the display device 51 and the back panel 13 so as to cool the display device 51. The display device 51 is cooled by this heat sink 190. A collective lens 195, which constitutes the projection-side optical system 220, is disposed in proximity to a front of the display device 51.

The projection-side block 168 has a lens group of the projection-side optical system 220 which projects on-light reflected by the display device 51 onto the screen. The projection-side optical system 220 is configured as a variable focus lens including a fixed lens group 225 which is incorporated in a fixed lens barrel and a movable lens group 235 which is incorporated in a movable lens barrel, whereby the variable focus lens enables zooming and focusing operations by moving the movable lens group 235 by a lens motor.

Next, the control of the excitation light shining device 70, the red light source device 120 and the blue light source device 300 by the light source control device will be described. The light source control device controls, with time sharing, turning on and off operations of the excitation light shining device 70, the red light source device 120 and the blue light source device 300 individually.

Specifically, as is shown in FIG. 5, the light source control device is configured so as to execute a control to turn on the red light source device 120, the excitation light shining device 70 and the blue light source device 300 individually and sequentially so as to include periods of time when the light of the red wavelength band, the light of the green wavelength band and the light of the blue wavelength band are emitted individually.

By doing so, while only the red light source device 120 is turned on, red light is incident on the light tunnel 175 via the light source optical system 140. While only the excitation light shining device 70 is turned on, the excitation light is shone onto the luminescent wheel 101 of the luminescent light emitting device 100, whereby green light emitted from the luminescent wheel 101 is incident on the light tunnel 175 via the light source optical system 140. While only the blue light source device 300 is turned on, blue light is incident on the light tunnel 175 via the light source optical system 140. Namely, the light source unit 60 can emit sequentially and separately light rays of the respective colors (red, green, blue) by turning on the excitation light shining device 70 and the two types of light source devices 120, 300 individually and separately to emit corresponding light rays. Then, the DMD, which is the display device 51 of the projector 10 displays, with time sharing, the light rays of the respective colors in accordance with data, thereby making it possible to generate a color image on the screen.

Since the light source control device can control the emission of light by the excitation light shining device 70 and the two types of light source devices 120, 300 individually, periods of time when the light rays of the respective colors are emitted within one frame can be changed freely. For example, the light source control device can not only control so that the light rays of the respective colors are emitted uniformly, that is, controls the emission of the green light so that it is emitted for the same period of time as those when the red light and the blue light are emitted as is shown in FIG. 6A but also control the emission of the green light so that only the green light is emitted for a longer period of time than those of the red light and the blue light as is shown in FIG. 6B.

Figure 7A:
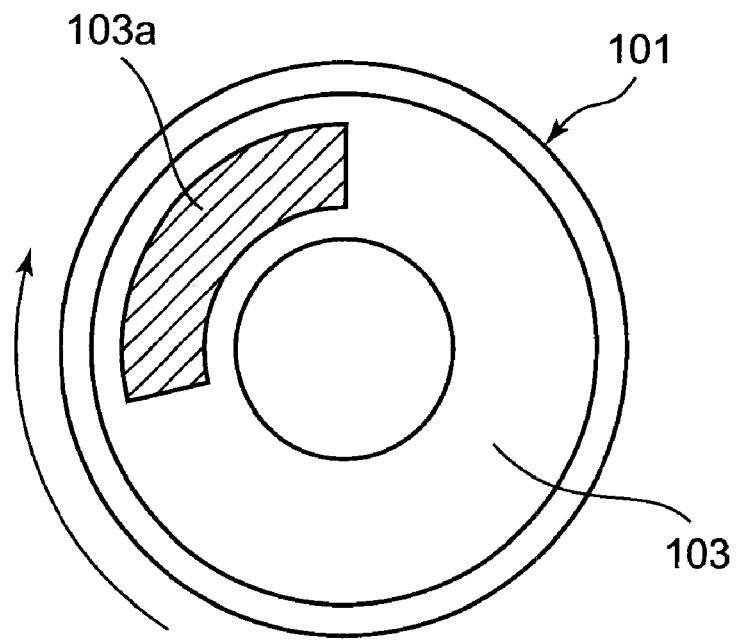
Figure 7B:
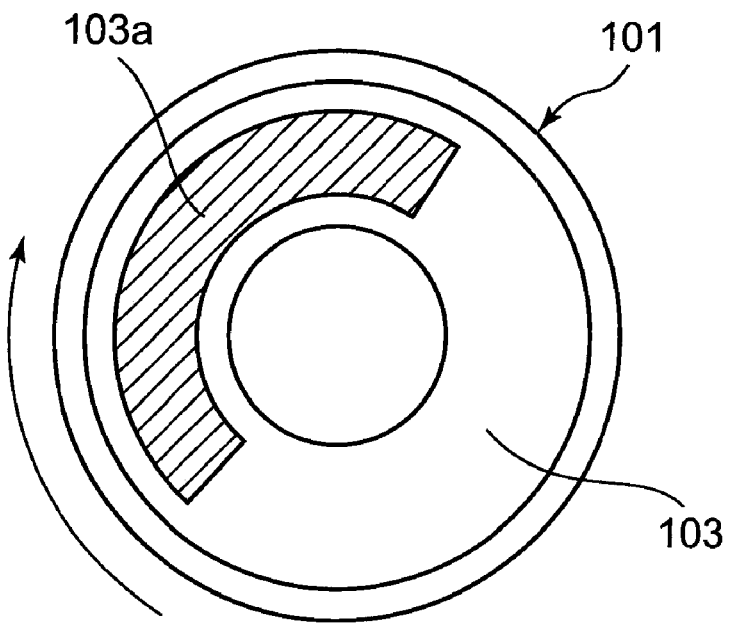

Namely, in the projector 10, the periods of time when the excitation light shining device 70, the red light source device 120 and the blue light source device 300 are turned on can be changed as required by the light source control device within one frame in which the excitation light shining device 70, the red light source device 120 and the blue light source device 300 are turned on once and sequentially, whereby the tint and brightness of an image displayed on the screen can be adjusted. However, here one event would be assumed as follows. When the light rays of the respective colors are emitted uniformly as is show in FIG. 6A with the luminescent wheel 101 made to rotate at a predetermined rotating speed, an excitation light shining area 103a which constitutes a range over which excitation light is shone onto the luminescent material layer 103 on the luminescent wheel 101 is on the order of one fourth of a full circumference as is shown in FIG. 7A. On the other hand, in the event that as is shown in FIG. 6B, the period of time when the green light is emitted is made longer than those when the other colored light rays are emitted, the excitation light emitting area 103a is also increased or lengthened as is shown in FIG. 7B. And the shining position of excitation light on the luminescent material layer 103 varies or scatters, causing portions where the excitation light is shone repeatedly and portions where almost no excitation light is shone, whereby the deterioration of only part of the luminescent material layer 103 is promoted, which calls for a reduction in light emitting efficiency of the portions so deteriorated, whereby the flickering of an image that is displayed on the screen is induced.

To cope with this, the light source control device according to the embodiment controls the emission of light by the excitation light shining device 70, the red light source device 120 and the blue light source device 300 individually and controls the excitation light source 71 of the excitation light shining device 70 and the wheel motor 110 of the luminescent wheel 101 so that a period of time required for the luminescent wheel 101 to rotate one rotation and a period of time when the excitation light shining device 70 is turned on are synchronized with each other. Specifically, the light source control device controls a rotating speed of the luminescent wheel 101 so that the number of rotations of the luminescent wheel 101 becomes one during the period of time when the excitation light shining device 70 is turned on.

Figure 8A:
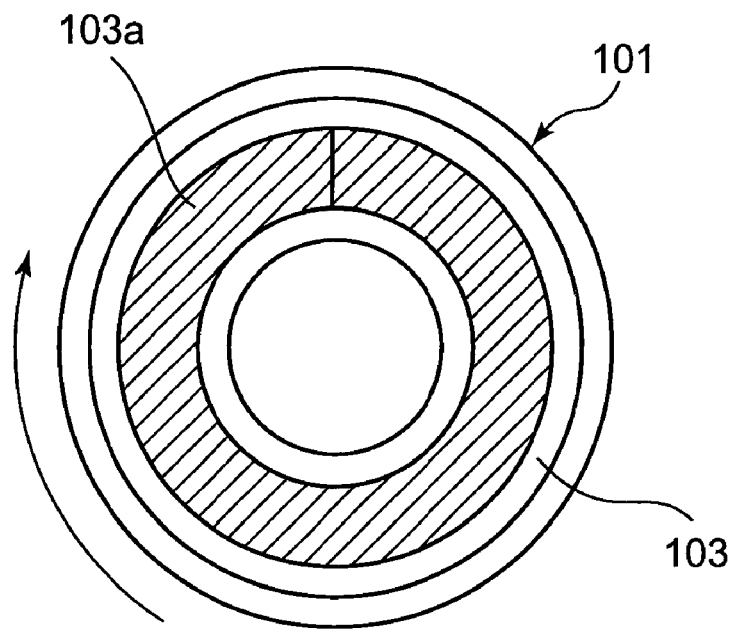
FIGS. 8A and 8B are exemplary drawings showing excitation light shining areas on the rotating luminescent wheel according to the embodiment of the invention.

Namely, when the light rays of the respective colors are emitted uniformly as is shown in FIG. 6A, the light source control device controls the rotating speed of the luminescent wheel 101 so that the excitation light shining area 103a on the luminescent wheel 101 extends a full circumference of the luminescent material layer 103 which is laid in the circumferential direction shown in FIG. 8A, that is, so that the number of rotations of the luminescent wheel 101 during the period of time when the excitation light shining device 70 is turned on becomes just one.

Figure 8B:
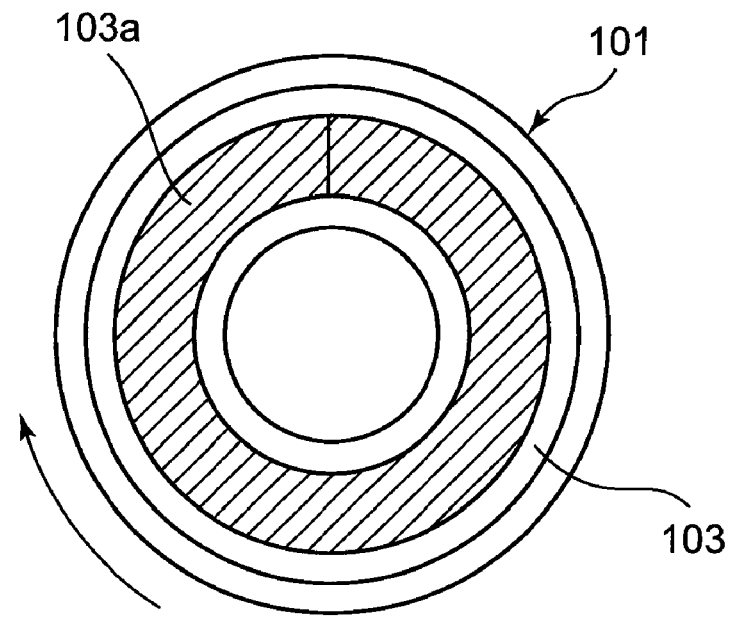

In executing various projection modes for adjusting tint and brightness, for example, in attempting to make green prominent in a projection image, in a projection mode for increasing brightness, when the period of time when the green light is turned on is lengthened as is shown in FIG. 6B, the light source control device controls the rotating speed of the luminescent wheel 101 so that the number of rotations of the luminescent wheel 101 during the period of time when the excitation light shining device 70 is turned on becomes just one, whereby the excitation light shining area 103a which constitutes the range over which excitation light is shone onto the luminescent material layer 103 on the luminescent wheel 101 extends a full circumference of the luminescent material layer 103 which is laid in the circumferential direction as is show in FIG. 8B. Namely, in the event that the period of time when the green light is emitted is lengthened, the light source control device executes a control to decrease the rotating speed of the luminescent wheel 101. Although not shown, in the event that the periods of time when the blue light and/or the red light is emitted are lengthened by shortening the period of time when the green light is emitted, the light source control devices increases the rotating speed of the luminescent wheel 101.

Namely, the light source control device executes the control to change the rotating speed of the luminescent wheel 101 in accordance with a change in the period of time when the excitation light shining device 70 is turned on. By doing so, the light source control device can control to synchronize the excitation light shining device 70 with the luminescent wheel 101 so that the period of time when the excitation light shining device 70 is turned on becomes the same as the period of time for the luminescent wheel 101 to rotate one rotation every time the various projection modes are changed so as to adjust the tint and brightness of an image in the projector 10.

In this way, according to the invention, the light source unit 60 includes the red light source device 120 and the blue light source device 300 which each have the semiconductor light emitting device such as a light emitting diode but does not include a light emitting diode which emits the light of the predetermined wavelength band of green with which it becomes relatively difficult to obtain high luminance in a semiconductor light emitting device. The light source unit 60 also includes, in place of such a light emitting device, the luminescent wheel 101 having the luminescent material layer 103 which can emit light rays of a predetermined wavelength band by receiving excitation light and the excitation light shining device 70 which shines excitation light onto the luminescent material on the luminescent wheel 101. Thus, there can be provided the light source unit 60 which can emit the various colored light rays with high luminance, and the projector 10 which can project an image with a superior color balance by including the light source unit 60 described above.

The light source unit 60 can adjust tint and brightness by changing freely a ratio of periods of time when the light rays of wavelength bands of the respective primary colors (red, green, blue). The light source control device is configured so as to control either of the excitation light shining device 70 and the two types of light sources 120, 300 so as to suppress the light source output only when the light of a predetermined wavelength band is emitted so as to adjust tint and brightness. Consequently, the projector 10 can be provided which can project onto the screen an image which is suitable for various situations, that is, an image which is made suitable for situations by executing a variety of modes with respect to brightness and adjusting tint.

According to the invention, the emission of light by the excitation light shining device 70 and the two types of light source devices 120, 300 is controlled individually, and the rotating speed of the luminescent wheel 101 is controlled so that the number of rotations of the luminescent wheel 101 during the period of time when the excitation light shining device 70 is turned on becomes one. By doing so, there can be provided the light source unit 60 which can prevent the scattering of deterioration of the luminescent material layer 103 which is laid in the circumferential direction and which can maintain its performance over a long period of time, and the projector 10 which includes the light source unit 60 so that no flickering is produced on the screen.

Since the rotating speed of the luminescent wheel 101 can also be changed in accordance with the various projection modes in the projector 10, there can be provided the light source unit 60 which can execute various projection modes in accordance with various situations and which can prevent the scattering of deterioration of the luminescent material and the projector 10 which is free from flickering which is produced on the screen.

The invention is not limited to the case in which the number of rotations of the luminescent wheel 101 during the period of time when the excitation light shining device 70 is turned on becomes one. Thus, the rotating speed of the luminescent wheel 101 may be controlled so that the luminescent wheel 101 rotates an integral number of rotations such as two or three rotations during the period of time when the excitation light shining device 70 is turned on. Namely, the light source control device can be configured so as to control the excitation light shining device 70 and the luminescent wheel 101 to be synchronized with each other so that the period of time when the excitation light shining device 70 is turned on becomes an integral number of times the period of time required for the luminescent wheel 101 to rotate one rotation. By doing so, similar to what has been described above, there can be provided the light source unit 60 which can prevent the local deterioration of the luminescent material layer 103 so as to maintain its performance over the long period of time and the projector 10 which includes the light source unit 60 so that no flickering is produced on the screen.

Since the excitation light source 71, the red light source 121 and the blue light source 300 can be duty driven or periods of time when the excitation light source 71, the red light source 121 and the blue light source 300 are turned off can be lengthened, the temperature of the light source unit 60 can be held low. In addition, since the average current value becomes low, the voltage applied can be increased so as to increase the outputs of the excitation light source 71, the red light source 121 and the blue light source 301 while they are turned on to emit corresponding light rays. Consequently, the light source unit 60 which can produce bright light rays of the respective colors and the projector 10 which includes this light source unit 60 can be provided.

The invention is not limited to the embodiment that has been described heretofore and can be modified or improved freely without departing from the spirit and scope thereof. For example, the light source control device is not provided in the projector 10 but may be provided in the light source unit 60 separately. In addition, the layout of the respective optical systems does not have to be limited to what has been described in the embodiment, and hence, the optical systems may be configured so as to be laid out variously.

In the embodiment, while the dichroic mirrors are used to alter the directions of the optical axes and to select transmission or reflection in accordance with wavelengths, the invention is not limited thereto. For example, other alternative devices such as dichroic prisms may be used to replace the dichroic mirrors.

In the embodiment, while the light source unit 60 is made up of the excitation light shining device 70 and the two types of light source devices such as the red light source device 120 and the blue light source device 300, the invention is not limited thereto. A configuration may be adopted in which light source devices can additionally be provided which emit light rays of wavelength bands of complementary colors such as yellow and cyan. The excitation light source 71 of the excitation light shining device 70 is not limited to the one which emits the light of the blue wavelength band. Thus, the excitation light source 71 may adopt a laser diode which shines excitation light of an ultraviolet range.

In addition, the invention is not limited to the embodiment that has been described above and can be modified variously in various stages in carrying out the invention without departing from the spirit and scope of the invention. The functions which are executed in the aforesaid embodiment may be combined as in many ways as possible in carrying out the invention. The aforesaid embodiment includes various steps, and by combining appropriately the plurality of constituent requirements disclosed, various inventions can be extracted. For example, in the event that the advantage can be obtained with some constituent requirements deleted from all the constituent requirements disclosed in the embodiment, the configuration in which the constituent requirements are so deleted can be extracted as an invention.

What is claimed is:

1. A light source unit comprising:
an excitation light shining device for emitting excitation light;
a luminescent wheel on which a luminescent material layer is laid in a circumferential direction which receives the excitation light from the excitation light shining device to emit a luminescent light ray of a predetermined wavelength band; and
a light source control device for controlling the emission of excitation light by the excitation light shining device and a rotating speed of the luminescent wheel, wherein
the light source control device controls the rotating speed of the luminescent wheel so that the luminescent wheel rotates an integral number of rotations during a period of time when the excitation light shining device is turned on.

2. A light source unit as set forth in claim 1, further comprising:
two types of light source devices which emit light rays of wavelength bands which are different from that of the luminescent light ray which is emitted from the luminescent wheel: and
a light source optical system for collecting the luminescent light ray which is emitted from the luminescent wheel and the light rays which are emitted from the two types of light source devices to a predetermined plane, wherein
the light source control device controls individually the emission of light rays by the excitation shining device and the two types of light source devices.

3. A light source unit as set forth in claim 1, wherein
in the event that the period of time when the excitation light shining device is turned on changes, the light source control device controls the rotating speed of the luminescent wheel so that the luminescent wheel rotates an integral number of rotations during the changed period of time when the excitation light shining device is turned on.

4. A light source unit as set forth in claim 1, wherein
the light source control device controls the rotating speed of the luminescent wheel so that the number of rotations of the luminescent wheel becomes one during a period of time when the excitation light shining device is turned on.

5. A light source unit as set forth in claim 2, wherein
the excitation light shining device comprises an excitation light source for emitting excitation light of a blue wavelength band, wherein
the two types of light source devices include a red light source device having a semiconductor light emitting device for emitting a light ray of a red wavelength band and a blue light source device having a semiconductor light emitting device for emitting a light ray of a blue wavelength band, and wherein
the luminescent light emitting area of the luminescent wheel receives the excitation light from the excitation light shining device to emit a light ray of a green wavelength band.

6. A light source unit as set forth in claim 5, wherein in one frame in which the excitation light shining device, the red light source device and the blue light source device are turned on once and sequentially, in the event that the periods of time when the excitation light shining device, the red light source device and the blue light source device are turned on change, the light source control device executes a control to change the rotating speed of the luminescent wheel in accordance with the changed period of time when the excitation light shining device is turned on.

7. A projector comprising:
the light source unit set forth in claim 1;
a display device;
a light guiding optical system for guiding light from the light source unit to the display device;
a projection-side optical system for projecting an image emitted from the display device onto a screen; and
a projector control device for controlling the light source unit and the display device.

* * * * *